United States Patent [19]

Aspinwall et al.

[11] 4,137,708

[45] Feb. 6, 1979

[54] JET PROPULSION

[75] Inventors: Robert H. Aspinwall; Charles R. Baker, both of Zionsville, Ind.

[73] Assignee: General Motors Corporation, Detroit, Mich.

[21] Appl. No.: 377,069

[22] Filed: Jul. 2, 1973

[51] Int. Cl.² ............................................. F23R 1/00
[52] U.S. Cl. ........................................ 60/204; 60/224
[58] Field of Search ................ 60/204, 224, 226, 261, 60/270, 262, 263

[56] References Cited

U.S. PATENT DOCUMENTS

| 3,060,679 | 10/1962 | Schmitt | 60/224 |
| 3,161,018 | 12/1964 | Sandre | 60/270 R |
| 3,514,952 | 6/1970 | Schumacher et al. | 60/226 |

Primary Examiner—Samuel Feinberg
Attorney, Agent, or Firm—Paul Fitzpatrick

[57] ABSTRACT

A jet propulsion engine and a method of operating a jet propulsion engine for propulsion of an aircraft over a wide range of speed from zero to supersonic. The engine is a turbofan type with a duct burner and with separate variable exhausts from the duct burner and from the gas turbine engine. The gas turbine core engine includes a gas generator and a low pressure turbine which drives the fan. The fan includes variable outlet guide vanes and the low pressure turbine includes a variable first-stage nozzle. The engine is operated as a normal duct burning by-pass jet engine from zero air speed up to about Mach 3. The fuel to the core engine is shut off through a transition range of speeds. Above this range the engine operates with only the duct burner supplied with fuel, with the gas generator windmilling, and with the low pressure turbine continuing to drive the fan to supercharge the duct burner, which operates as a supercharged ramjet.

2 Claims, 5 Drawing Figures

JET PROPULSION

The invention described and claimed herein was made under a contract with the Department of Defense or a subcontract thereunder.

Our invention relates to jet propulsion engines particularly suited for operation over a wide range of forward speed from zero to relatively high supersonic speeds. The invention relates to a type of turbofan engine and method of operating such an engine which provide the thrust characteristics at low aircraft speed of a turbofan engine of known type, provide the high speed capabilities of a ramjet engine, and provide these modes of operation without any significant compromise of operation in either mode. More specifically, our invention relates to propulsion by a duct burning type of turbofan engine which has provisions for eliminating fuel to the gas generator at high forward speeds and allowing the gas generator to windmill. The low pressure turbine continues to drive the fan to contribute pressure rise to air entering the duct burner which can thus function as a supercharged ramjet. The engine embodies variable exhaust nozzles from the core engine and by-pass duct and variable geometry in the fan and fan-driving low pressure turbine. By suitable control of such variable geometry, the engine is capable of operating over a range from zero forward speed to about Mach 4.5. The engine thus provides means for and a method of generating thrust and propelling aircraft over this wide range of speed.

The principal object of our invention is to provide a jet propulsion engine capable of propelling an aircraft over a range of speed from zero to Mach 4 or 5. A further object of the invention is to provide a practical engine of suitable dimensions and of a relatively high degree of fuel economy which is capable of operating over this wide range. A further object is to provide an engine capable of propelling an aircraft at very high speed which is also capable of propelling the aircraft for takeoff, climb, cruise, and loiter. A still further object is to provide a jet propulsion power plant combining the advantages of a ducted fan jet engine and a supercharged ramjet engine. A still further object is to provide a supercharged ramjet engine for high speed propulsion.

Another object is to provide an improved method of generating thrust for propulsion of aircraft over a wide speed range.

The nature of our invention and its advantages will be clear to those skilled in the art from the succeeding detailed description of the preferred embodiment of the invention and its incorporation in an aerial vehicle, and the accompanying drawings thereof.

Figure 1:
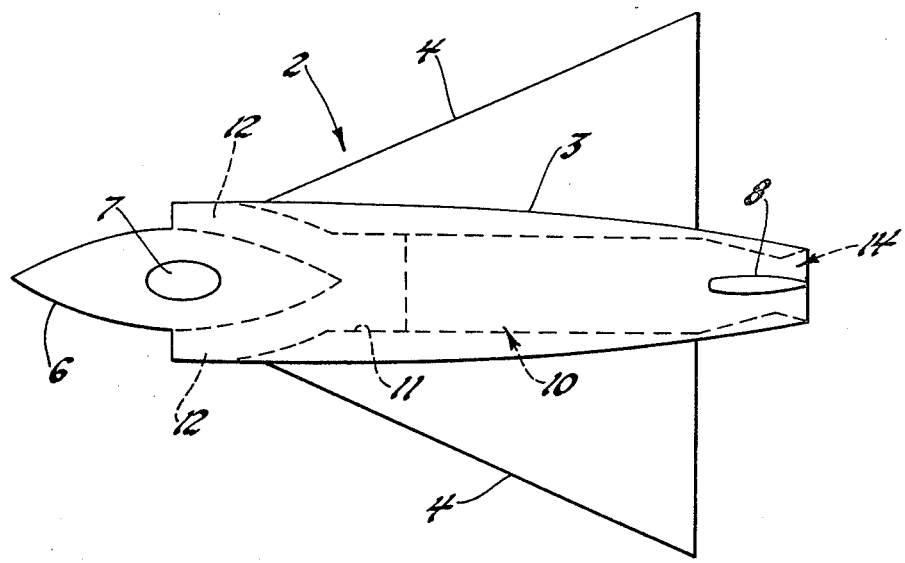
FIG. 1 is a schematic plan view of a high speed aircraft.

FIG. 1 illustrates generally in plan view a representative high speed aircraft. It is not intended to be a realistic drawing of any particular aircraft, since our invention is not concerned with details of aircraft structure. As shown in FIG. 1, an aircraft 2 includes a fuselage 3 and wings 4 of a delta planform. The fuselage includes a nose 6, a pilot's canopy 7, and a vertical tail fin 8. A jet propulsion engine 10 according to the invention is mounted in a passage 11 extending longitudinally of the fuselage.

Air inlets 12 in the sides of the fuselage supply air to the forward end of engine 10. The inlets may be of variable area and may incorporate various structures to handle properly the flow of air to the inlet over a wide range of operating conditions. The details of the inlets also are immaterial to our invention, which is concerned with the structure of engine 10.

The air entering the engine is accelerated and discharged through a jet propulsion nozzle or nozzles 14 at the tail of the aircraft. The aircraft could have more than one engine, and the engines could be mounted in nacelles distinct from the fuselage.

Figure 2:
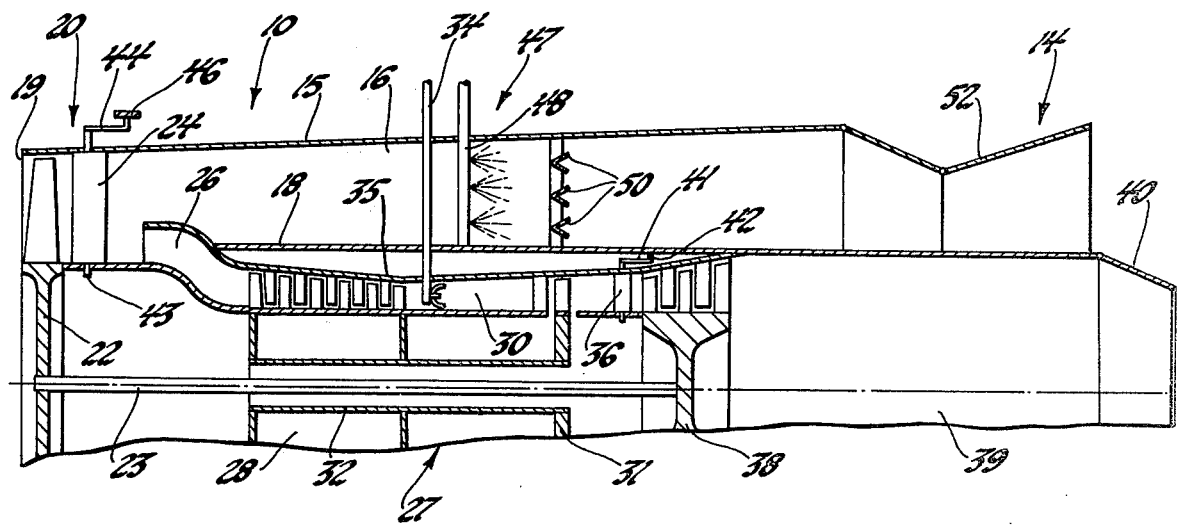
FIG. 2 is a somewhat schematic longitudinal sectional view, taken on a plane containing the axis of the engine, of a jet propulsion engine embodying our invention.

FIG. 2 illustrates somewhat conventionally or schematically a jet propulsion engine incorporating the invention. The engine 10 includes an outer case 15 of generally cylindrical form. This case is the outer wall of a fan duct 16, the inner wall of which is defined principally by a generally cylindrical sheet metal structure 18. The aircraft air duct 11 feeds into an annular engine air inlet 19 within which is mounted the fan 20 which may be single-stage or multistage, preferably the former in most cases. The fan includes a bladed fan rotor 22 driven by a shaft 23; the fan blades drive the air through outlet guide vanes 24 into the duct 16 and also into an annular inlet 26 into the core engine or gas turbine 27 of the power plant.

Air entering the core engine through inlet 26 passes through a multistage axial flow compressor 28, combustion apparatus 30, and a high pressure or gas generator turbine 31. Turbine 31 is coupled through shaft 32 to the compressor 28. Fuel is supplied to the combustion apparatus from any suitable supply and control means through a fuel line 34. The core engine includes an outer case 35 spaced from the duct inner wall 18. The exhaust from turbine 31 flows through an annular duct and a variable setting nozzle 36 into the rotor 38 of a low pressure turbine. This turbine is connected to the fan rotor 22 by shaft 23. Low pressure turbine 38 discharges into an exhaust duct 39 which may be defined by the inner wall 18 of the fan duct. The exhaust duct terminates in a variable area jet propulsion nozzle 40.

The variable setting turbine nozzle 36 may be of suitable known structure. Illustrated schematically, each vane of nozzle 36 has pivots at the ends of its span and each is fixed to an actuating arm 41, the arms being coupled to an actuating ring 42 encircling the engine case 35. The ring may be rotated around the axis of the turbine to move the arms 41 and thus change the setting of the vanes 36 and the area of the low pressure turbine nozzle. Such structures are well known, examples being described in the Mason U.S. Pat. No. 3,542,484 of Nov. 24, 1970 and to Wall, U.S. Pat. No. 3,558,237 of Jan. 26, 1971. Any suitable controlled actuator or actuators (not illustrated) may be provided.

The outlet guide vanes 24 of the fan 20 are also of variable setting type, being mounted on pivot axes 43 each of which bears an actuating arm 44, the arms being coupled to an actuating ring 46. Suitable hydraulic or other actuators (not illustrated) may rotate the ring 46 as desired to vary the setting of the vanes 24 and thus the area for air flow and affect the flow through the fan.

The major part of the air delivered by fan 20 flows into the fan duct 16 within which is mounted a duct burner 47 including fuel distributing means illustrated as fuel spray bars 48 distributed around the axis of the engine and flameholder means illustrated as rings 50 supported between walls 15 and 18. Combustion in the air in the fan duct increases its temperature and thereby increases the velocity of flow of the air from the duct, and consequently the propulsive thrust.

The fan duct terminates in a suitable convergent-divergent jet nozzle 14 illustrated as including a ring of divergent flaps 52. The detailed description and system of operation of the nozzle is not described herein, since such variable convergent-divergent nozzles are well known and details are immaterial to our invention. Examples are described in Spears et al, U.S. Pat. No. 3,004,385 of Oct. 17, 1961, and Johnson et al, U.S. Pat. No. 3,612,400 of Oct. 12, 1971.

Overall, apart from the proportioning of the parts and relations of the design parameters of the components of the engine to make it operable in the desired modes, the engine as illustrated may be considered to be a conventional fan duct type of engine except for the provision of the variable vanes 24 in the fan and 36 in the low pressure turbine nozzle, which provide for control of operation of the engine to accommodate to the speed range desired. Therefore, there is no reason to go into details of structure of the fan, turbines, combustion apparatus, duct burner, and jet propulsion nozzles. These may follow the state of the art understood by those engaged in the design of advanced jet propulsion engines.

As an example of the sort of service to which such an engine might be put, we may assume that the aircraft makes a takeoff run and climbs at gradually increasing speed as altitude is gained, with the engine operating as a normal ducted fan engine with fuel supplied to both combustion apparatuses. It is well known that aircraft can fly at extremely high speed only at relatively high altitudes because the dynamic loadings due to ram pressure rise of air at low altitude otherwise will overstress the airplane, and ordinarily the engine. It may be assumed, therefore, that the aircraft would take off and climb at accelerating speed such that the dynamic loading remains roughly equal to a constant limit, reaching Mach 3 at a substantial altitude of the order of 45,000 feet. Thereafter, the aircraft continues to climb and accelerate to a maximum of around Mach 4.5 at about 90,000 feet. At this altitude the air has a density about 1/50 of sea level density so that the high ram pressure rise attendant upon such supersonic speed is acceptable. At such altitudes, the sonic velocity in air is approximately 975 feet per second which is, of course, Mach 1. The maximum speed contemplated with the embodiment of the invention described here is approximately Mach 4.5 or about 2800 miles per hour. The plane may change course, descend to lower altitudes, and cruise at reduced speed, but the very high speed is possible only at high altitudes.

The physical size of an engine would depend upon the thrust requirement, which in turn depends upon the nature of the aircraft and the number of engines. Total thrust equal to about one-half the aircraft loaded weight may be required.

Values of parameters of the engine may vary depending upon service, but it may be helpful to point out some preferred values. It is considered preferable that fan 20 have a sea level static pressure ratio of 2.0 to 2.5 and the compressor 28 a ratio of about 8. For normal turbofan operation, a by-pass ratio of the order of 3 to 4 is preferred; that is, with approximately 20 to 25% of the air entering the core engine and the remainder passing through the fan duct. Analysis has shown that it is most feasible to design the engine for match of the components at sea level standard conditions, thus allowing the design points of the compressor and the fan to be set on their characteristic maps at the highest allowable corrected speed. High altitude high speed cruise may require less than half of takeoff thrust. For low speed cruise, the engine may be operated as a normal ducted fan without duct burning with much greater fuel economy.

Operation of the engine as described above may be clarified by reference to FIG. 3, which is a plot of fan pressure ratio against percent of design corrected airflow (corrected for conditions at the inlet to the fan) for a fan having a nominal pressure ratio of 2.5. In this plot the bounding line 60 represents the surge or stall line of the fan. The curves 62 represent values of corrected rotor speed in percent of maximum speed, the corrected rotor speed being corrected for conditions at the inlet to the fan.

The approximately straight line 64 is the operating line of the engine at a high pressure turbine rotor inlet temperature of 3460° Rankine. Points identified as 66 through 70 on this line represent, respectively, operation at 20,000 feet and Mach 1.72; at 28,000 feet and Mach 2.05; at 36,000 feet and Mach 2.46; at 40,000 feet and Mach 2.71; and at 44,900 feet at Mach 3.05. Line 64 continues toward regions of lower flow and pressure ratio as core engine fuel is reduced at very high speeds to limit rotor inlet temperature and finally terminates in a shaded area 72 which represents operation at Mach 3 with no fuel. Operation to the left of this point is operation in which the core engine receives no fuel. The shaded area 75 adjacent to area 72 represents operation at Mach 4.5. With the use of variable geometry in the engine configuration described, it becomes feasible to reach Mach 4.5. In operation of the engine, as aircraft speed is increased a point is reached at about Mach 3 at which core engine fuel reduction is initiated. Over a rather narrow transition range of perhaps 3/10 Mach, the fuel is progressively shut off.

At still higher speeds, the low pressure turbine nozzle is closed to some extent, with the result that pressure drop across the high pressure turbine is reduced and pressure drop across the low pressure turbine which drives the fan 20 is increased. Also, in this phase of operation the core engine nozzle 40 should be opened to some extent, thereby further increasing the pressure drop across the low pressure of fan driving turbine. Thereby, the gas generator rotational speed and air flow are controlled.

Figure 4:
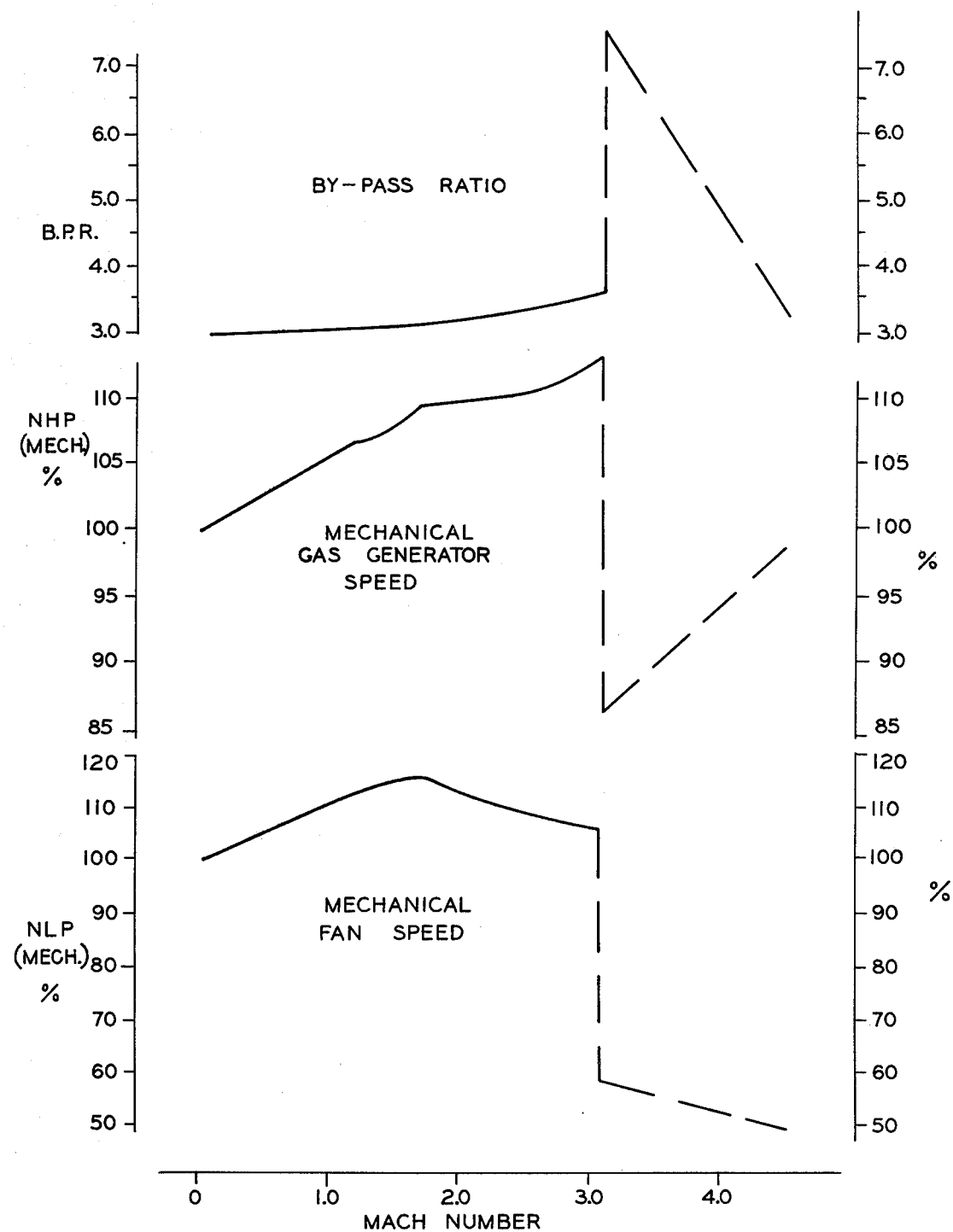
FIG. 4 is a plot of by-pass ratio, mechanical high pressure rotor speed, and mechanical fan speed against Mach number.
Figure 5:
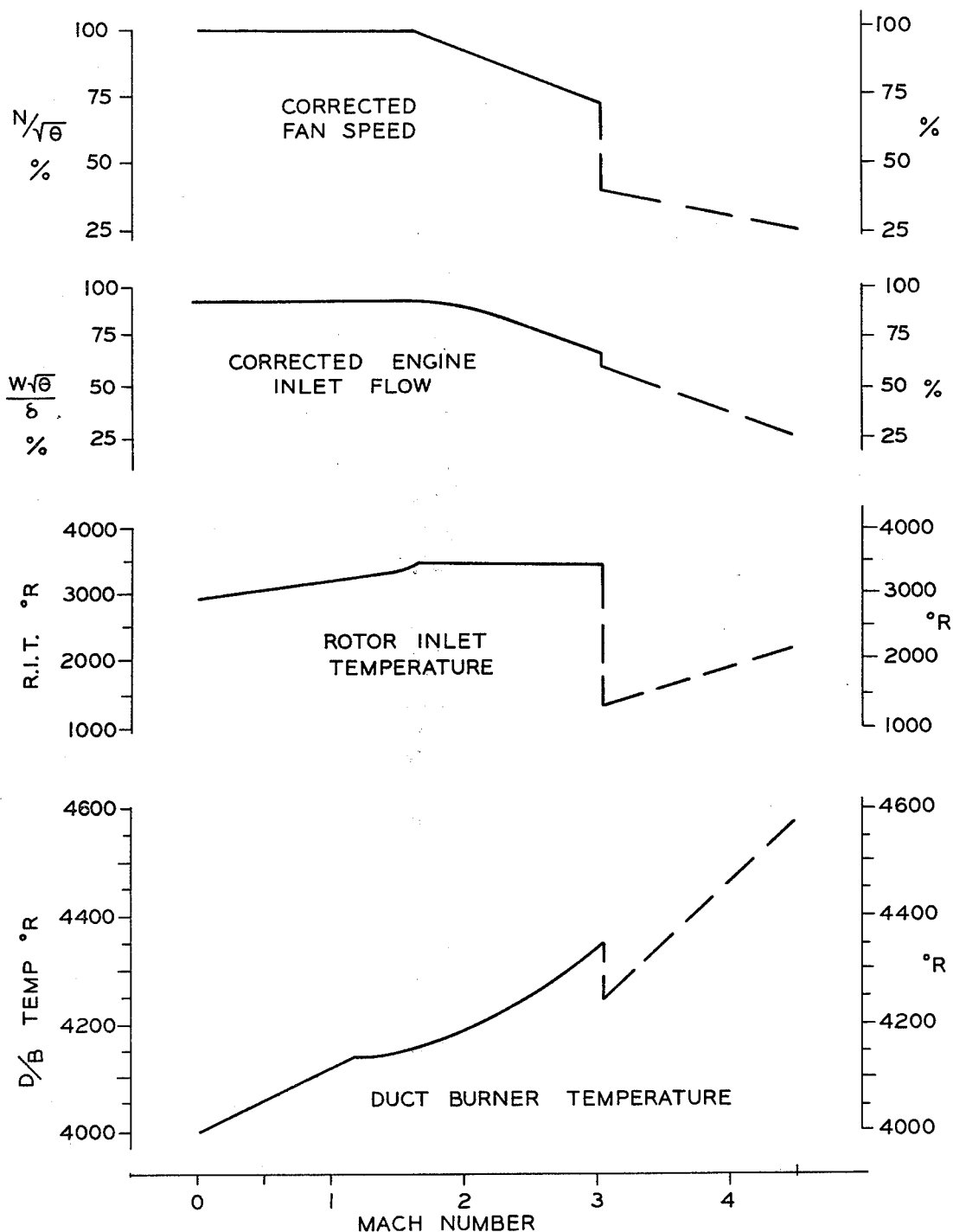
FIG. 5 is a plot of corrected fan speed, corrected engine inlet flow, rotor inlet temperature, and duct burner temperature against Mach number.

We may now consider the curves of FIGS. 4 and 5 which illustrate the sequence of engine operating conditions beginning with zero forward speed of the aircraft and then increasing to Mach 4.5 as the aircraft climbs. It will be seen that, beginning with the initiation of takeoff roll, the engine is operating with the corrected fan speed at its design value or 100%, at which it remains to about Mach 1.8; the corrected engine inlet flow is likewise approximately 100% up to about Mach 1.8. The turbine rotor inlet temperature is gradually increasing from 3000° Rankine to about 3450° Rankine over the same range, and then remains constant up to about Mach 3. Duct burner temperature increases with aircraft speed up to a break point at about Mach 3.

The turbine inlet temperature is increased to maintain the corrected fan speed and inlet flow at normal value until the limit of turbine rotor inlet temperature is reached, after which the corrected fan speed and corrected engine inlet flow decrease with increasing speed of the aircraft up to Mach 3. The duct burner temperature increases because of the higher temperature of the entering air due to ram temperature rise.

As will be seen from FIG. 4, the mechanical fan speed rises from 100% to about 115% of the sea level static design value at around Mach 1.8 and then decreases to the break point at Mach 3. The mechanical gas generator rotor speed, as shown in FIG. 4, increases from its 100% value at zero Mach up to about 115% at Mach 3. By-pass ratio increases gradually from 3.0 to about 3.7 over this same range up to Mach 3.

It will be apparent that there is an abrupt break in all of these curves at about Mach 3, this representing the transition from turbofan operation with duct burner to supercharged ramjet operation. At about Mach 3 the fuel flow to the combustion apparatus 30 is shut off, the shutoff usually being scheduled over a short period of time to avoid abrupt transients in engine operation. This is necessary because the temperature rise due to ram effect and compression reaches a point at which turbine temperature limits would be exceeded by the addition of fuel. This is partly due to the fact the air available for turbine cooling would be at a quite high temperature. Thus at this transition the corrected fan speed decreases, the engine inlet flow corrected for temperature and density decreases very slightly, and the rotor inlet temperature drops off sharply from its maximum value to about 1400° Rankine. At this time there is a slight drop in duct burner temperature due to an increase in by-pass ratio which increases flow through the by-pass duct. As shown in FIG. 4, the by-pass ratio increases from approximately 3.8 to about 7 and the gas generator rotor speed drops to about 87% of normal. Along with this, the low pressure spool including the fan drops to about 60% of rated mechanical speed. The increase in by-pass ratio is due primarily to opening of the by-pass duct nozzle to increase the flow through the by-pass duct and also to some extent to the closing of the low pressure turbine nozzle 36 (which may not be closed to any great extent; something on the order of 10%).

Thus, at the end of the transition the engine is operating as a ramjet with supercharging effected by fan 22 driven by turbine rotor 38. The high pressure spool is simply windmilling. The thrust from the engine being greater at full throttle than the aircraft drag, acceleration continues, and with such acceleration the by-pass ratio decreases to approximately the initial value of 3, the mechanical high pressure rotor spool speed builds up to near 100%, and the mechanical fan speed continues to drop until it reaches about 50% of normal, thus minimizing stress in the fan blades. The corrected fan speed is decreasing due to the drop in mechanical speed and also to the increase in temperature of the air, and thus winds up at about 37% at Mach 4.5. Corrected engine inlet flow (corrected for temperature and density) is down to about 25% of the initial value. The rotor inlet temperature and duct burner temperature increase as aircraft speed increases.

Mach 4.5 is the maximum aircraft speed of the engine to which this description is directed. It will be apparent that at any given altitude the speed may be maintained below the maximum by reduction of fuel. It is possible to gradually reduce duct burner flow to reduce thrust and thereby aircraft speed; and for cruise at low speed duct burning may be terminated. Low speed flight, loiter, or landing may thus be effected at any suitable speed level.

Figure 3:
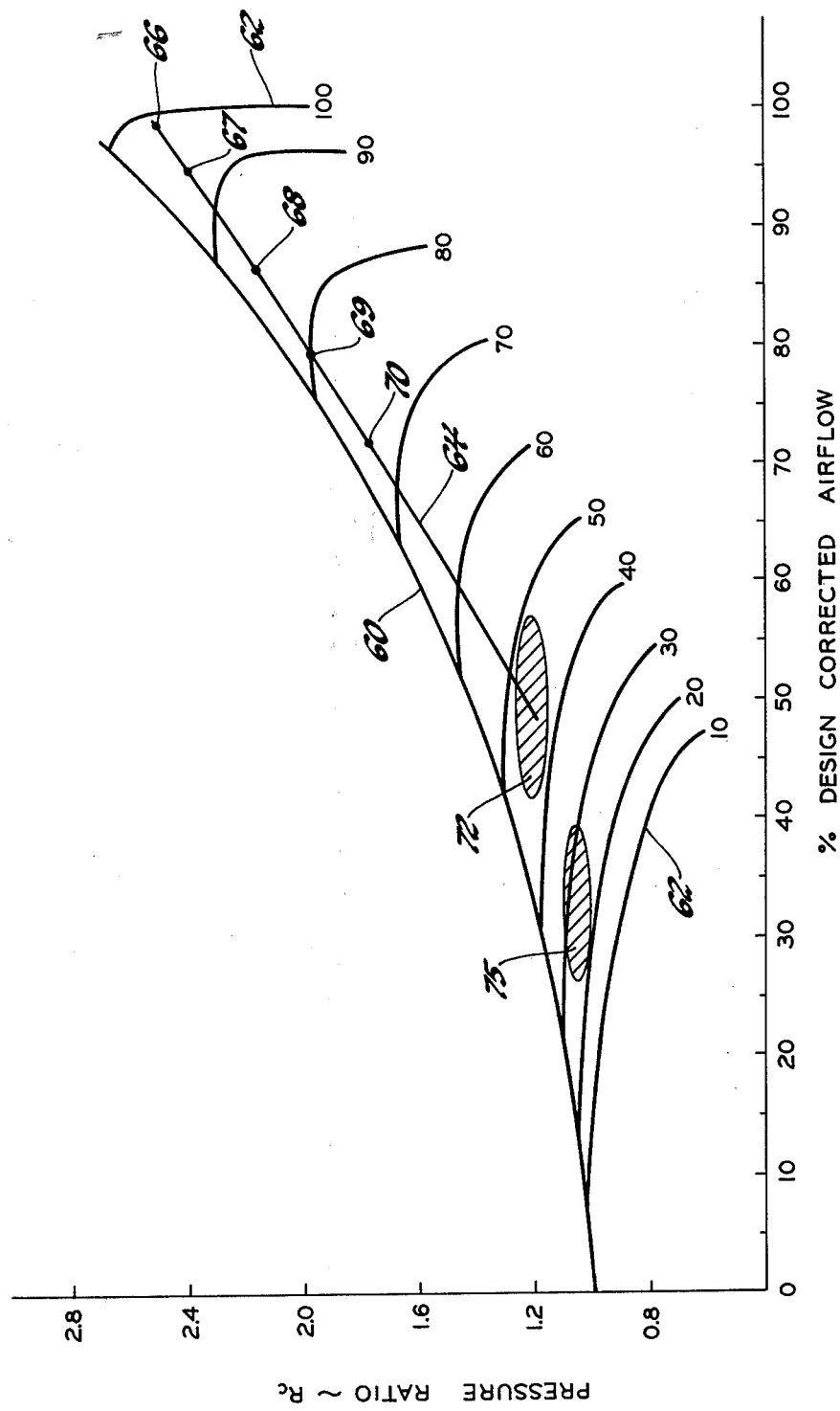
FIG. 3 is a plot of pressure ratio as against percent of design corrected airflow for such an engine.

It should be understood that the curves of FIGS. 3, 4, and 5 are representative of the type of engine and that actual parameters or values are subject to variation to suit a particular operating characteristic desired, or a particular aircraft or aircraft capability desired.

In general, the concept which we consider most vital to our engine concept is the use of the low pressure turbine without introduction of fuel to the core engine as a means for driving the fan during high speed flight of the aircraft. This makes possible supercharging of the ducted fan which then amounts to a supercharged ramjet and has greater thrust capacity than an equivalent size ramjet without supercharging can attain. The presence of the fan also makes possible the low speed capability of the ramjet engine with supply of fuel to the core engine. Also, the core engine makes possible use of the engine as a non-augmented ducted fan engine; that is, without burning in the duct for low speed flight with reasonable fuel economy. The windmilling rotation of the high pressure spool under no fuel condition permits the continued driving of accessories such as fuel pumps for control from the high pressure spool.

Also, it is important that our engine avoids declutching devices, rotor locking systems, and flow by-passing, dumping, or blocking valve arrangements, all of which are highly undesirable in the sort of environment considered here.

The detailed description of the preferred embodiment of the invention for the purpose of explaining the principles thereof is not to be considered as limiting or restricting the invention, since many modifications may be made by the exercise of skill in the art.

We claim:

1. A method of operating a jet propulsion engine over a wide range of forward speed, the engine including an inlet duct having a forward fan therein with variable flow guide vanes, a fan duct downstream of the inlet duct including a burner, a core gas generator engine downstream of the inlet duct, the core gas generator engine including a high pressure turbine, a variable nozzle and fan turbine coupled to the fan and being energized from the core engine, and first and second variable jet nozzles supplied respectively from the fan duct and the fan turbine, the method comprising: supplying fuel through the core engine and duct burner for operation as a normal duct-burning bypass engine from zero forward speed up to a supersonic value of forward speed; progressively reducing core engine fuel following attainment of the supersonic value of forward speed to a fuel cut off point at a supersonic transition forward speed; and at speeds above the supersonic transition forward speed supplying predetermined ram heated and pressurized air from the inlet duct to the core engine; controlling the variable flow guide vanes to reduce flow to the core engine; adjusting the variable flow guide vanes to reduce flow of the predetermined ram heated and pressurized air; adjusting the variable nozzle to control the expansion ratio of the reduced flow as it passes across the high pressure turbine to produce a regulated extraction of energy from the reduced flow to produce a controlled auxiliary power output from the core gas generator engine; concurrently opening the second variable jet nozzle to increase the expansion ratio across the fan turbine as ram heated and pressurized air flows through the core engine to extract energy therefrom to drive the fan to supercharge the duct burner during a range of forward speed higher than the transition value, and supplying fuel to the fan duct burner at speeds in excess of the transition value and controlling the first variable jet nozzle to be more opened.

2. A jet propulsion engine comprising, in combination, a forward fan including a rotor and variable guide vanes; a core engine including in flow series a compressor supplied with air from the fan, combustion apparatus, and a high pressure turbine connected to drive the compressor; a low pressure turbine supplied with motive fluid from the high pressure turbine, the low pressure turbine including a variable first stage nozzle and a rotor; means mechanically coupling the fan rotor to the low pressure turbine rotor; an exhaust duct from the low pressure turbine including a variable jet nozzle; a by-pass duct supplied by the fan; a fuel burner in the duct; and a variable jet nozzle at the outlet of the by-pass duct; said variable guide means and said variable first stage nozzle having a first operating position to define a relatively open area for air flow from the forward fan into the by-pass duct and the core engine and to maintain a first predetermined flow of motive fluid from the high pressure to the low pressure turbine so that under low ram conditions of air entering into the fan and with fuel supplied to the combustion apparatus and duct burner the engine operates with the turbines driving the compressor and fan, respectively, as a normal duct-burning turbofan engine; said variable jet nozzle from the low pressure turbine and said variable jet nozzle at the outlet of the by-pass duct having a first operative position during the normal duct-burning turbofan operation to restrict the air flow from the low pressure turbine and to restrict flow from the fan duct; means for eliminating fuel flow to the core engine and to continue fuel flow to the duct burner under high ram conditions of entry into the fan at high forward speeds of the engine; said variable guide means and said variable first stage nozzle having a second operating position during high ram conditions of air entry into the fan to reduce the expansion ratio across the high pressure turbine during high ram conditions of air entry into the fan wherein air is heated to produce extraction of energy from air flow through the high pressure turbine so as to maintain drive of the compressor at a reduced speed when fuel is supplied only to the duct burner; said variable jet nozzle from the low pressure turbine being controlled to open under high ram conditions of air entry into the fan to increase the expansion ratio across the low pressure turbine during high ram air flow into the core engine to extract energy from ram heated air passing to the core engine to cause the low pressure turbine to drive the fan to supercharge the core engine and duct burner during high ram conditions of air entry into the fan.

* * * * *